July 17, 1956   B. JANKELSON   2,754,592
METHODS AND INSTRUMENTS FOR SETTING ARTIFICIAL TEETH
Filed Aug. 2, 1954   3 Sheets-Sheet 1
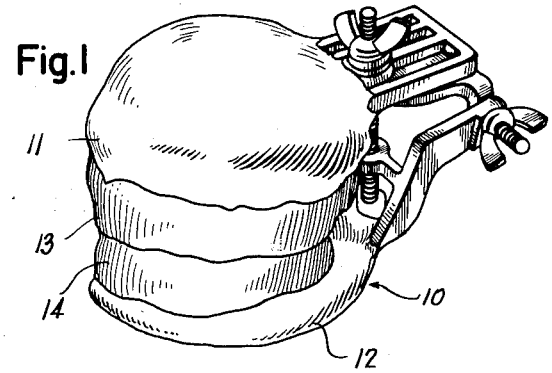
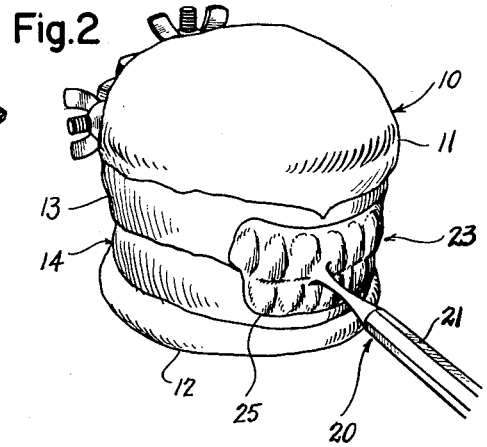
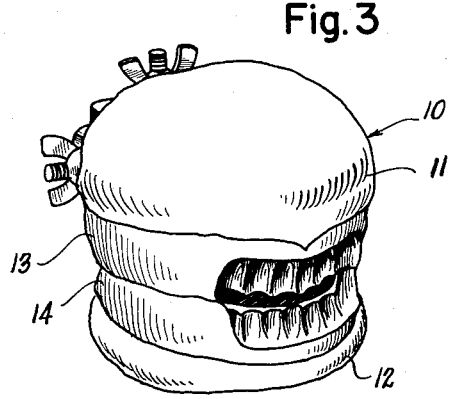
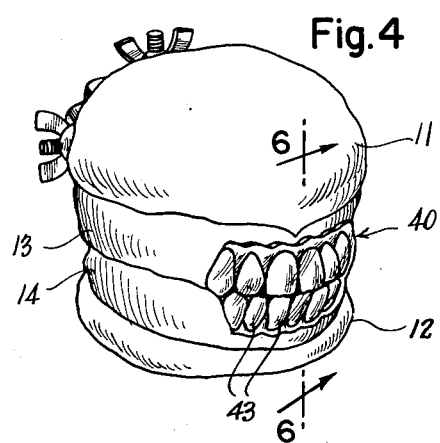
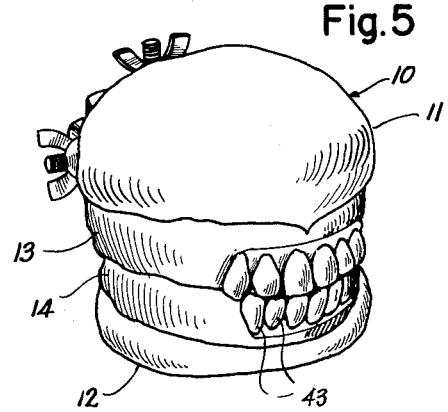
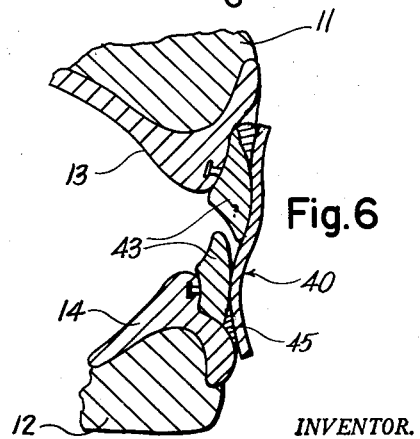
INVENTOR.
Bernard Jankelson
BY
Cook & Robinson
ATTORNEYS

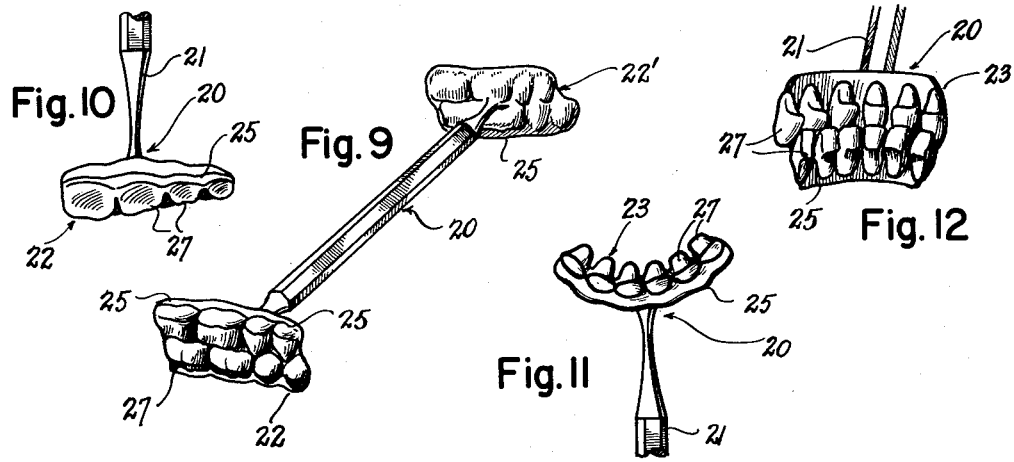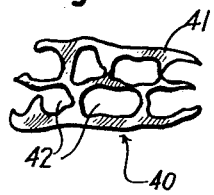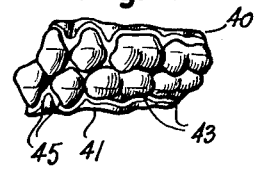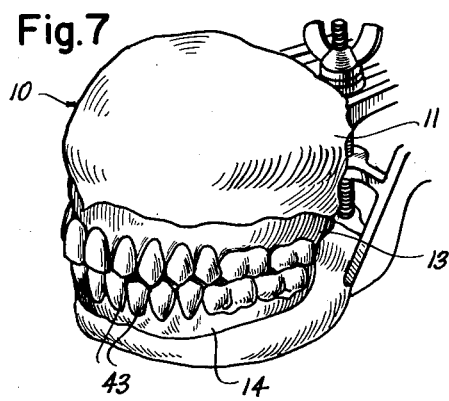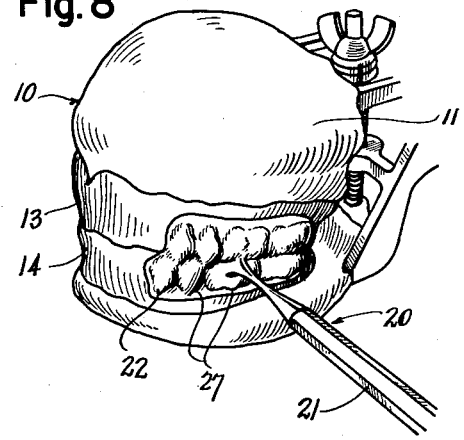
INVENTOR.
Bernard Jankelson
ATTORNEYS

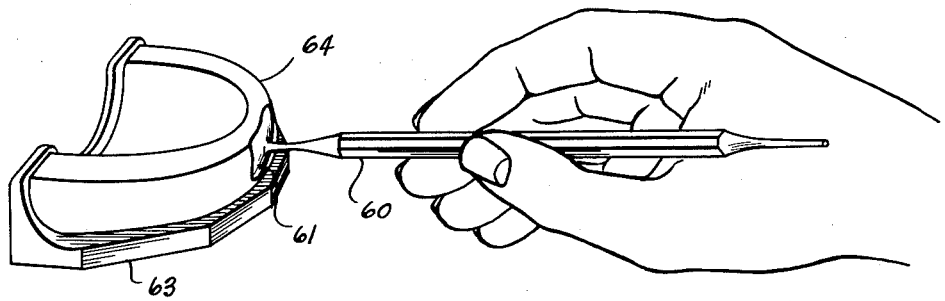
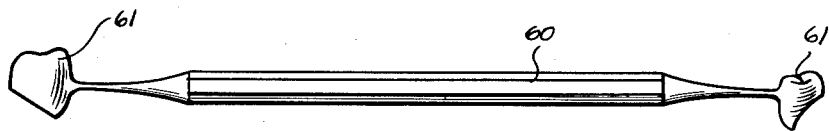
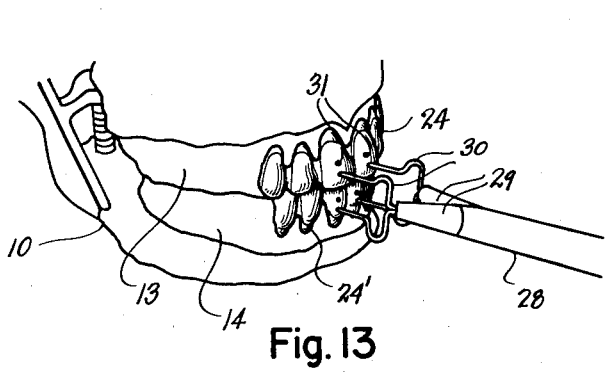
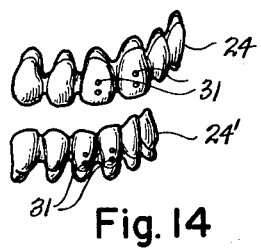

United States Patent Office 2,754,592
Patented July 17, 1956

2,754,592

METHODS AND INSTRUMENTS FOR SETTING ARTIFICIAL TEETH

Bernard Jankelson, Seattle, Wash.

Application August 2, 1954, Serial No. 447,258

12 Claims. (Cl. 32—70)

This invention relates to the setting of artificial teeth; more particularly the present invention embodies a method or technique and instruments whereby it is possible to repeatedly duplicate and reproduce arrangements of teeth which are pleasing in appearance and which are in the proper position for correct functional relationship. In addition to facilitating this desirable result, the methods and materials employed substantially simplify and expedite the procedure of setting artificial teeth.

This application is a continuation-in-part of my allowed application Serial No. 319,893, filed November 12, 1952, and now abandoned.

In order to provide a better understanding of the advantages residing in this invention, a description of the present day technique of setting artificial teeth in wax follows.

Artificial teeth are customarily supplied by manufacturers in regional sections or matched combinations of individual teeth. Upper anteriors are supplied as a set of six individual teeth retained side by side on a flat or flat-curved strip of wax, known as carding wax. Lower anteriors are furnished as a set of six and are similarly carded. Posterior teeth are supplied as a set of eight uppers, and a corresponding set of separately carded lowers. They are provided in these combinations in order to allow flexibility of choice of the various components that make up a full set. For example, it may be necessary, because of individual requirements, to use long upper posterior teeth and shorter opposing lower posterior teeth, or to use smaller lower anteriors than usually match a given size of upper anteriors, etc. A full set is obtained by ordering each separately-carded group.

Although certain arrangements of the teeth are characteristic and particularly pleasing for each distinct type of tooth, and manufacturers sometimes provide photographs and other visual aids to such arrangement, the actual setting of the teeth in such relationship to each other must be accomplished by the technician arranging one tooth at a time.

Preparatory to the setting of the artificial teeth, plaster casts of the upper and lower jaws are mounted on an articulator in correct relationship to each other. A wax rim, in which the teeth are to be set, is formed on each cast. Because the precise location, tilt and slope of the tooth to be placed is a matter of conjecture at this time, a relatively large amount of wax is now softened by means of a spatula, usually one with a thin spoon-shaped blade. The spatula is heated over a Bunsen burner, repeatedly if necessary, and is moved around in the wax or applied to its surface in a series of puddling strokes. The aim is to soften a deeper and larger area than may be necessary to receive the tooth. If the wax were not softened in sufficient area and depth, the underlying hard wax would prevent the tooth from going fully into place. It would then be necessary to remove the tooth, cleanse it of wax, soften the wax rim further, and try the tooth again. It is a time consuming procedure which is often unavoidable because of the inherently haphazard determination of the location, size or shape of the area to be melted to receive the tooth.

The wax having been softened and removed in the general area in which the tooth is to be placed, the appropriate tooth is removed from the carding wax and while held in the fingers, it is pushed into the soft wax of the rim. The fingers are then removed so that the tooth can be seen. Because the view while placing it was obscured, the tooth will seldom be in the correct or desired position or have the desired tilt or slope. To overcome the improper result, the tooth must be moved and repositioned using the fingers or the blade of the spatula. When necessary the wax is resoftened to enable the changes to be made. The same procedure is repeated and followed for the placing of each tooth. Then, because the teeth must not only be in satisfactory position individually, but also must be in pleasing relationship to each other, further softening of the wax and changing of the relative position of the teeth is almost invariably necessary. Furthermore, since the above described procedure involves the melting of relatively large amounts of wax, the contraction of the melted wax as it cools presents a serious problem. It may pull the teeth out of position to such as extent that even careful technicians find it necessary to make a final correction for this error. Since neither in the melting of the wax to receive the tooth nor in the actual positioning of the tooth, is there any precise means of visualizing the finished product, the present day procedure is necessarily one of haphazard trial and error. It is time consuming and laborious, involving an inordinate amount of rearrangement and refinement.

In view of the foregoing, the principal object of my invention is to provide practical methods and instruments whereby desirable arrangements of the teeth, once having been accomplished, may be repeatedly duplicated with substantial saving of time and effort, and in such a manner that each tooth is received and retained in its individual properly shaped and positioned wax socket; yet when required, it may be moved to produce any individual variation from the standardized arrangement.

My invention comprises instruments that are essentially metal reproductions or facsimiles of an artificial tooth or a number of such teeth arranged in correct relationship to each other. These tooth facsimiles are attached to handles which may if desired, be removable. The metal reproductions have many advantages and uses. They aid in the selection, or in verifying the selection, of the proper shape and size of teeth for the particular case; in addition, when they have been heated, they can be precisely and accurately held and pressed into the desired position in the wax, melting the wax in the proper location and to the precise size and shape required to receive the tooth or teeth; furthermore, because of the construction and manner of using my new and improved instruments, the technician has a full and unobstructed view of his work and the position of the instrument relative to the wax rims.

To determine the shape and size of artificial teeth to be used, metal facsimiles of upper and lower teeth are tentatively selected and assembled on the instrument handle. As an example of tentative selection wherein the case involves all of the teeth (full dentures) the upper and lower anteriors are assembled together, as are the upper and lower posteriors of the right side and those of the left side, each assembly is tried in place between the casts on the articulator. If a certain mold of tooth is too long to go into place, so that considerable grinding of the tooth would be required, a shorter tooth or group is selected, thus avoiding much labor.

The proper size and shape of teeth having been determined, the corresponding metal facsimiles are heated and pressed into position in the wax rims. This may be done with relative speed and ease as the metal teeth facsimiles are already in full view, in correct relationship to each other, and only need to be pressed into their over-all position. By this operation, the plurality of sockets, of correct size and position, and in proper alignment one to the other, are quickly and easily formed. For full dentures, the preferred procedure is to first form the sockets and place the assembled upper and lower anteriors, then to form the sockets and place the assembled posteriors on each side. As each group of sockets is formed, the handle may be disengaged, leaving the various facsimiles in place in the wax, yet free of each other. The wax rims containing the metal facsimiles may be tried in the mouth of the patient and the size and placement of the teeth again verified prior to actually setting the teeth in the wax. If changes need to be made, such as shortening the uppers and lengthening the lowers, the metal facsimiles involved are heated with a small blow-flame, removed, wax added to the rim if necessary, and the facsimiles reassembled and placement corrected. If the teeth prove to be of the desired mold, and the placement is correct, the metal facsimile is heated sufficiently to permit its removal, leaving precise sockets in the wax. The corresponding artificial teeth are then placed into each socket and they may be quickly and accurately positioned in their proper places because of the precisely formed sockets made by the metal facsimiles.

In order to further expedite the procedure, another part of my invention consists of assembly jigs, which may be of plastic or other material. The jigs hold the proper teeth in the same relative position and in the same assembled relationship as the teeth reproductions of the metal facsimiles. After the metal facsimile is removed from the wax, the corresponding group of teeth, assembled in their jig, is pressed into its place, preferably while the wax is still soft. To facilitate the procedure further, the teeth may be waxed into the jig to provide the proper wax outline around the teeth, as well as to retain them in the jig. In its preferred use, the teeth would be mounted in their corresponding jigs, at the factory, in ready made arrangements that are pleasing and functional, and purchased by the dentist mounted and ready for use. This constitutes a new and improved method of mounting teeth to be supplied to the dentist. If this cannot be arranged, then the assembly jigs alone may be supplied and the teeth removed from the carding wax strip and assembled in the jig by the dentist or technician. After the jig-assembled teeth are in place in the wax rim, the jig is removed. If any alterations are necessary or desirable, they may be quickly and easily accomplished and the dentist or technician can proceed with the formation and completion of the artificial denture.

In accomplishing the various objects and advantages of this invention, I have provided the improved details of construction, the preferred forms of which are illustrated in the accompanying drawings, wherein:

Fig. 1 is a perspective view of an articulator with the upper and lower wax bite rims mounted therein.

Fig. 2 is a perspective view illustrating the application of the heated portion of the instrument to the wax bite rim.

Fig. 3 illustrates the sockets formed in the wax bite rim by the application of the heated instrument.

Fig. 4 is a perspective view illustrating a plurality of teeth mounted in a jig and applied to the sockets in the wax bite rim.

Fig. 5 illustrates the upper and lower teeth set in the wax rim and the jig removed.

Fig. 6 is a vertical cross-section taken on line 6—6 in Fig. 4.

Fig. 7 is a perspective view illustrating the full set of upper and lower teeth mounted in the wax bite rim.

Fig. 8 is a perspective view illustrating the heated instrument applied to the wax bite rim along one side thereof to form posterior sockets.

Fig. 9 is a perspective view of the instrument for forming posterior sockets.

Figs. 10 and 11 are plan views illustrating the shape of the socket forming tooth facsimiles shown in Figs. 9 and 12.

Fig. 12 is a front view of the plurality of socket forming facsimiles for anterior sockets.

Fig. 13 illustrates an instrument of alternative form.

Fig. 14 illustrates the upper and lower metal facsimiles of Fig. 13 in separated relationship and removed from the handle.

Fig. 15 illustrates the jig in which the teeth are mounted.

Fig. 16 is a plan view of the jig illustrated in Fig. 15.

Fig. 17 illustrates the teeth mounted and waxed in the jig.

Fig. 18 is a perspective view showing the use of an instrument with a single socket forming facsimile mounted thereon.

Fig. 19 is a side view illustrating single facsimiles mounted on opposite ends of the instrument.

Fig. 20 is a side view of an instrument having facsimiles for different teeth mounted on its opposite ends.

For the formation of dentures for various patients, a set or plurality of socket forming instruments is required and in addition, instruments of different sizes and shapes will be required and utilized for forming sockets for various shapes and sizes of dentures for particular patients. It will be understood that the size and shape of teeth of persons differs very substantially, therefore, socket forming instruments which embody various sizes and shapes of socket forming metal tooth facsimiles will be required.

Referring more in detail to the drawings:

In Fig. 1, I have illustrated a conventional, hinged articulator designated in its entirety by reference numeral 10. A cast 11 and base plate 12 are mounted therein, as are the upper and lower wax bite rims 13 and 14 respectively.

In Figs. 9 to 15, 18, 19 and 20, I have illustrated socket forming instruments and the instruments illustrated in Figs. 9 to 12 are designated in their entirety by reference numeral 20. These instruments include a handle portion 21 which, in its preferred form, is approximately six inches long. Secured to the handle at opposite ends thereof, are impression molds 22—22' and 23 which are attached in a plane substantially at right angle to the longitudinal axis of the handle.

The molds comprise a base or plate 25 on which are formed groups of facsimiles or lugs 27. These lugs are metallic replicas of artificial teeth and they have been accurately and precisely spaced and aligned one to the other in proper relationship. The lugs project outwardly and are formed in two rows one above the other. In Fig. 9, I have illustrated the molds 22—22' which are eight lug posterior formations and in Fig. 12 the mold comprises a twelve lug anterior formation. The several lugs are different in size and shape so as to form in the wax bite rim, sockets of the size and shape to receive the proper tooth to be set in a prescribed socket. The particular configuration of the individual lug or tooth reproduction is so shaped as to be similar in size and configuration to the tooth to be set in the socket formed thereby.

I have previously indicated that the various molds and the size and shape of the metal facsimiles will vary depending upon the particular requirements of the patient for which the artificial dentures are being made and if desired, more or fewer lugs can be included on each mold. I have found that in many cases it is practical to use a set of instruments which includes only three molds. The mold illustrated in Figs. 11 and 12 will provide the sockets for the anterior teeth or in the front of the wax bite rim and the sockets formed by the molds 22—22' will provide the posterior sockets on the right and left side of the wax bite rim.

In Figs. 13 and 14, I have illustrated an instrument of alternative construction wherein the mold is made in two parts, namely, upper and lower sections 24 and 24' respectively. In use, these parts are joined by a handle which will releasably hold the parts in relatively rigid relationship. The particular construction is not important so long as the desired result is achieved. The instrument illustrated in Fig. 13 comprises a handle 28 and arms 29—29 joined to the handle at one end thereof and at an angle thereto. Extending outwardly from the arms, away from the handle, are wire, clip members 30—30. These wires are adapted to project into the selected holes 31—31 formed in the molds. The purpose of this construction is to permit the molds to remain in the wax and to remove the handle and also to permit adjustment of the relationship of the upper and lower sections. With the handle removed the bite rims can be tried in the patient's mouth and proper positioning and effect determined.

In Figs. 16 and 17, I have illustrated a plastic jig which forms a part of my invention. The jig may be plastic, metal or of any suitable material. The jig is designated in its entirety by reference numeral 40. The size and shape of the jig will vary depending upon the size and shape of the corresponding mold and the teeth to be mounted therein. The jig comprises a convexly curved body portion 41 in which are openings 42—42. The several openings are of size and shape to receive and retain teeth 43—43 to be mounted therein. In its preferred use, the selected and proper teeth are mounted in the jig at the factory and purchased by a dentist mounted and ready for use or application. In Fig. 17, I have illustrated the group of teeth mounted in the jig. It will be understood that a plurality or set of jigs will be required to provide for the production or construction of dentures of size and shape for various patients. The teeth may, if desired, to be waxed into the jig as at 45 to obtain the proper wax outline around the teeth and if required a pressure sensitive tape (not shown) may be applied against the front surface of the teeth to hold them in position.

In practicing my new and improved method and technique, the instruments and materials are utilized in the manner hereinbefore described.

The use of instruments which I employ in the practice of my invention, have several additional advantages. For example, the mold on the end of the handle may be set at a proper angle, relative to the handle, so that the technician, by holding the handle in a horizontal plane or parallel to the surface of the table on which the wax bite rim is mounted, will cause the sockets to be formed at the angle required for the proper setting of the teeth. The technician can readily observe the result to be produced and can alter the position of the instrument as desired or required. Also the mass or bulk of the socket forming lugs will cause the instrument to retain the heat for considerable period of time and will melt their way more rapidly into the wax. This permits the accomplishment of the entire socket forming operation without requiring that the instrument be reheated. Also, the plurality of socket forming lugs on an instrument prevents or overcomes the problem of repeated trial and resetting of teeth and the resulting necessity of cleaning the wax from the teeth when it is necessary to reset and realign the teeth. The rapid and more precise heating of the wax tends to overcome the resulting problem of contraction when the wax cools, as a lesser amount of underlying wax is heated or melted in this rapid heating operation.

In Fig. 18, 19 and 20, I have illustrated instruments on which a single socket-forming metal tooth facsimile or lug is mounted on the opposite ends thereof. The handle portion of the instrument is designated by reference numeral 60 and I have designated the respective lugs generally by reference numeral 61. The lugs vary only in their shape and size in conformance with the varying shapes and sizes of the teeth to be set. A single lug may be used if and when it is desired to form a single socket. It is used generally in the same manner as the instruments which include a plurality of lugs, and even when using a single lug instrument, the time and proficiency required in forming the sockets in the wax bite rim is greatly reduced. These single lug instruments may be used to realign or modify the positioning of teeth formed with the multiply lug instrument.

In Fig. 18, I have illustrated a simple base 63 and a lower wax bite rim 64 and it will be noted that the lug portion of the instrument is pressed against the wax rim with the handle in a plane substantially at right angle thereto.

My invention embodies a new and improved technique or method of setting artificial teeth in a wax bite rim and I do not desire to restrict my invention to the particular size, shape or construction of the instruments used or to the manner in which the teeth are mounted in preparation for application to the socket. My invention includes the several steps of forming the sockets and placing the teeth therein, and further includes the instruments and materials utilized in carrying out the method.

Having thus described my invention, what I claim as new therein and desire to secure by Letters Patent is:

1. A tool for forming a socket in wax bite rims to receive artificial teeth; said tool comprising a lug formed as a metallic replica of the tooth that is to be set; and a handle member mounting the said lug at one end thereof; said lug being adapted, when heated and pressed by the said handle member against the wax rim, to melt a socket in the wax which is substantially the counterpart of the back portion of the tooth.

2. A tool as recited in claim 1 wherein the said handle member is fixed to that portion of the lug that corresponds to the face of the tooth and extends directly forwardly therefrom.

3. A tool as recited in claim 1 wherein the said rod which constitutes the handle forming member has one end portion thereof terminating in an elongated taper to an end of small diameter that is fixed to that surface of the lug that corresponds to the face of the tooth of which the lug is a replica, and said handle member extends directly forwardly from the face of the lug to which it is attached.

4. A tool for forming sockets in wax bite rims; said tool comprising a mold representing a group of aligned metallic tooth facsimiles of the teeth to be set; a handle member mounting the mold at one end thereof, said mold being adapted, when heated and pressed by said handle member against the wax rim, to melt a plurality of aligned sockets in the wax which are in proper position and substantially the counterpart of the back portion of the teeth to be set therein.

5. A tool as in claim 4 wherein the mold comprises upper and lower rows of teeth properly spaced and aligned.

6. A tool as in claim 4 wherein the said handle member is fixed to that portion of the mold that corresponds to the face of the teeth and extends directly forwardly therefrom.

7. A tool as in claim 4 wherein the handle member is removably affixed to the mold.

8. A tool as in claim 5 wherein the upper and lower rows of teeth are separable and the handle includes means for assembling the respective rows in varying positions one to the other.

9. The method of setting artificial teeth in a wax bite rim; comprising preparing the wax bite rim; forming a tooth receiving socket in the wax rim by pressing a heated metallic tooth replica against the wax at the desired location, placing a tooth of corresponding size and shape in the formed socket and repeating the socket forming and tooth setting procedure for each tooth to be set in the rim.

10. The method of setting artificial teeth in wax bite rims; comprising preparing the wax bite rims; simultaneously forming a group of aligned and spaced tooth receiving sockets in the wax by pressing thereagainst a heated mold comprising a plurality of metallic tooth facsimiles, setting the teeth of corresponding size and shape in their respective sockets and waxing in the set teeth.

11. The method as in claim 10 wherein the teeth are mounted in a jig and are simultaneously set in their respective sockets.

12. The method as in claim 10 wherein the molds are temporarily retained in the wax bite rims to permit the application of the bite rims to the patient's mouth to determine if the sockets are formed in the correct relative positions.

References Cited in the file of this patent

UNITED STATES PATENTS

| | | |
|---|---|---|
| 1,518,075 | Kesling | Dec. 2, 1924 |
| 2,302,376 | Myerson | Nov. 17, 1942 |